United States Patent [19]
Lindenman et al.

[11] Patent Number: 5,494,343
[45] Date of Patent: Feb. 27, 1996

[54] METHOD OF DETECTING AN INOPERABLE PUMP MOTOR IN AN ANTI-LOCK BRAKING SYSTEM

[75] Inventors: Charles E. Lindenman; Charles F. Huddleston, both of South Bend, Ind.

[73] Assignee: AlliedSignal, Inc., Morristown, N.J.

[21] Appl. No.: 344,755

[22] Filed: Nov. 23, 1994

[51] Int. Cl.$^6$ ........................................ B60T 8/00
[52] U.S. Cl. ........................................ 303/122.12
[58] Field of Search ................ 303/10–11, 92, 303/115.4, 116.1, 122.12

[56] References Cited

U.S. PATENT DOCUMENTS

| | | | |
|---|---|---|---|
| 4,025,124 | 5/1977 | Fuchs | 303/10 |
| 4,402,554 | 9/1983 | Belart | 303/10 |
| 4,428,624 | 1/1984 | Farr | 303/116 |
| 4,477,125 | 10/1984 | Belart et al. | 303/116 |
| 4,556,260 | 12/1985 | Maehara | 303/116 |
| 4,569,560 | 2/1986 | Kubo | 303/116 |
| 4,722,576 | 2/1988 | Matsuda | 303/92 |
| 4,738,493 | 4/1988 | Inagaki et al. | 303/116 |
| 4,778,226 | 10/1988 | Brown | 303/116 |
| 4,783,125 | 11/1988 | Belart et al. | 303/92 |
| 5,000,525 | 3/1991 | Reinartz et al. | 303/116 |
| 5,033,800 | 7/1991 | Willmann | 303/116 |
| 5,106,171 | 4/1992 | Leppek et al. | 303/100 |
| 5,184,299 | 2/1993 | Hogan et al. | 364/426.02 |
| 5,188,440 | 2/1993 | Muller et al. | 303/116.2 |
| 5,197,787 | 3/1993 | Matsuda et al. | 303/10 |
| 5,197,788 | 3/1993 | Fennel et al. | 303/100 |

*Primary Examiner*—Josie Ballato
*Attorney, Agent, or Firm*—Leo H. McCormick, Jr.; Larry J. Palguta

[57] ABSTRACT

An anti-lock braking system comprises a pump motor which is energized initially during vehicle drive-off and then deactivated. The deactivation voltage and subsequent motor voltages are evaluated against predetermined voltage levels for an appropriately operating pump motor to determine whether or not the anti-lock braking system should be deactivated and a failure warning mechanism activated to warn the vehicle operator of the deactivated system.

16 Claims, 3 Drawing Sheets

METHOD OF DETECTING AN INOPERABLE PUMP MOTOR IN AN ANTI-LOCK BRAKING SYSTEM

The present invention relates generally to anti-lock braking systems, and in particular to an anti-lock braking system having a pump motor whose operability is evaluated at vehicle drive off.

BACKGROUND OF THE INVENTION

Many anti-lock braking systems have been utilized on vehicles in order to prevent lock-up of the wheels during braking. Anti-lock braking systems utilize a pump which provides fluid pressure within the system. Typically, during the drive-off of the vehicle (when the vehicle motor is started and the vehicle driven away from its parked position) the electronic control unit or "ECU" will check electrical continuity through the motor monitor circuit to ground, and then operate the motor briefly to check for a twelve volt level on the monitor circuit. If the pump motor fuse blows during this test (which is an unlikely event without the existence of a dead short in the circuit), then it is possible to determine that the pump motor failed to operate. It is highly desirable to provide a pump motor test at vehicle drive-off which will determine easily and accurately whether or not the motor has operated at an acceptable performance level for the anti-lock braking system.

SUMMARY OF THE INVENTION

The present invention provides solutions to the above by providing a method of determining the operability of a pump motor in an anti-lock braking system, comprising the steps of:

(a) determining if the pump motor has been deactivated and the voltage of the pump motor at said deactivation, (b) determining if the voltage at deactivation exceeds a predetermined first voltage value, (c) initiating anti-lock braking system failure warning means if the deactivation voltage is less than said predetermined first voltage value, (d) maintaining the deactivation voltage as a shut-off voltage value if the deactivation voltage is greater than said first predetermined voltage value and proceeding to a next step (e), (e) determining if actual motor voltage is greater than a second predetermined voltage value, (f) calculating a derivative of the difference between said shut-off voltage value and said second predetermined voltage value if the actual motor voltage is less than said second predetermined voltage value, (g) determining if the calculated derivative is greater than a set fault value, and (h) initiating said anti-lock braking system failure warning means if said derivative is greater than said set fault value.

DESCRIPTION OF THE DRAWINGS

One way of carrying out the invention is described in detail below with reference to the drawings which illustrate an embodiment in which.

DESCRIPTION OF THE INVENTION

Many anti-lock braking systems utilize a pump to provide fluid pressure within the system. The pump is operated by a pump motor and it is critical that the pump perform as required during the operation of the vehicle. If the pump does not operate, for whatever reason, then fluid pressure will not be provided to the anti-lock braking system and the system will either fail to operate at all or operate at an unacceptable level of performance. Typically, when the vehicle is started and driven from an at-rest or parked position, the anti-lock braking system's electronic control unit or ECU will check the circuit continuity through the motor monitor circuit to ground, and then operates briefly the motor to check for twelve volts on the motor monitor circuit. To determine whether or not the motor is running requires the occurrence of a blown fuse for the pump motor during the test, and this is an unlikely event in the absence of a dead short within the system. The present invention provides an anti-lock braking system and method for examining the voltage of the pump motor after the pump motor is deactivated. If the pump motor was operating as commanded when it was activated by the ECU, the voltage will, after deactivation, return to zero volts gradually because a permanent magnet motor becomes a generator as it returns to rest. This is known as back "EMF" (electro-motive force). If the pump motor did not operate, or has degraded function, then the decay rate of the motor voltage occurs too quickly (greater than a predetermined value). The anti-locking braking system will be disabled, along with the activation of a warning light which can be viewed by the vehicle operator. Should the pump motor have returned to zero volts at a decay rate less than a pre-determined value, then the pump motor has functioned in an appropriate manner. The system and method utilize an evaluation of the pump motor voltage which is present on the motor monitor circuit, and may be implemented via software present within the ECU.

Figure 1:
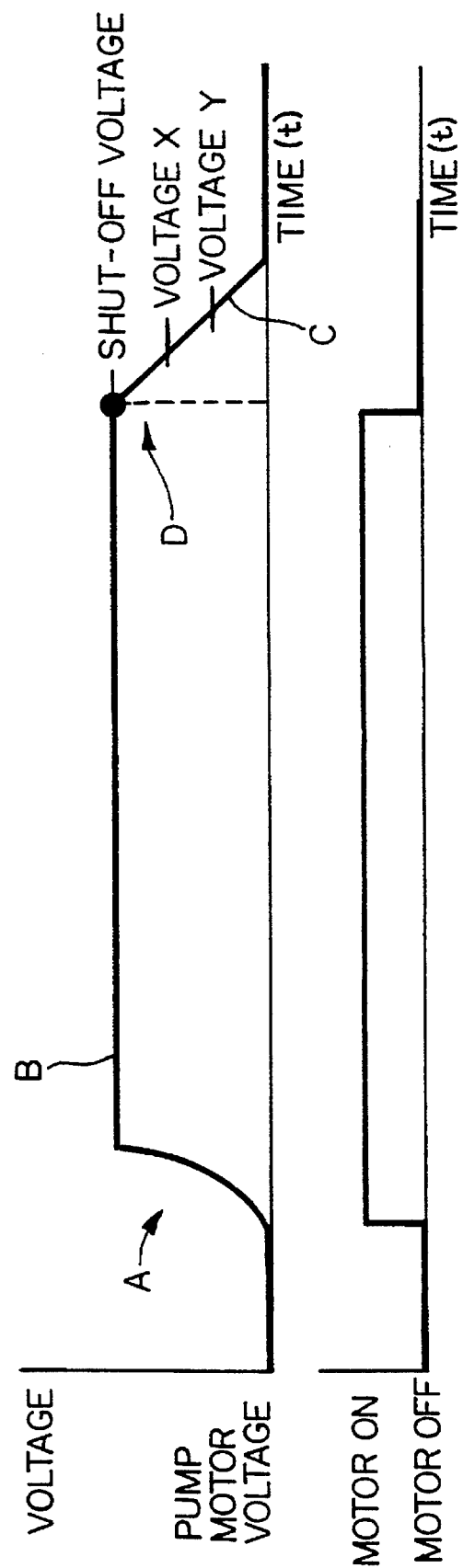
FIG. 1 is an illustration of the activation of the pump motor and the corresponding pump motor voltage effected during vehicle drive off.

Referring to FIG. 1, there is illustrated in the lower graph the activation and deactivation of the pump motor over a predetermined period of time, approximately 130 milliseconds. The graph directly above the motor on-off activation graph illustrates the voltage which is present within the motor monitor circuit during the activation and deactivation of the pump motor by the ECU. As the pump motor is activated, the voltage increases to a constant motor voltage represented by portion B of voltage curve A, and then as the pump motor is deactivated by the ECU, the voltage returns gradually via curve C to zero volts, because of the back EMF. Dotted line curve D is illustrated as a typical quick decay of voltage to zero volts in the situation where the pump motor did not operate. Typically, portion B of curve A is in the voltage range of ten to thirteen volts, voltage X is approximately seven volts and voltage Y is approximately one volt. The presence of voltage, as a result of the back EMF, on the motor monitor circuit, is utilized by the software program for evaluation of pump motor operation.

Figure 2:
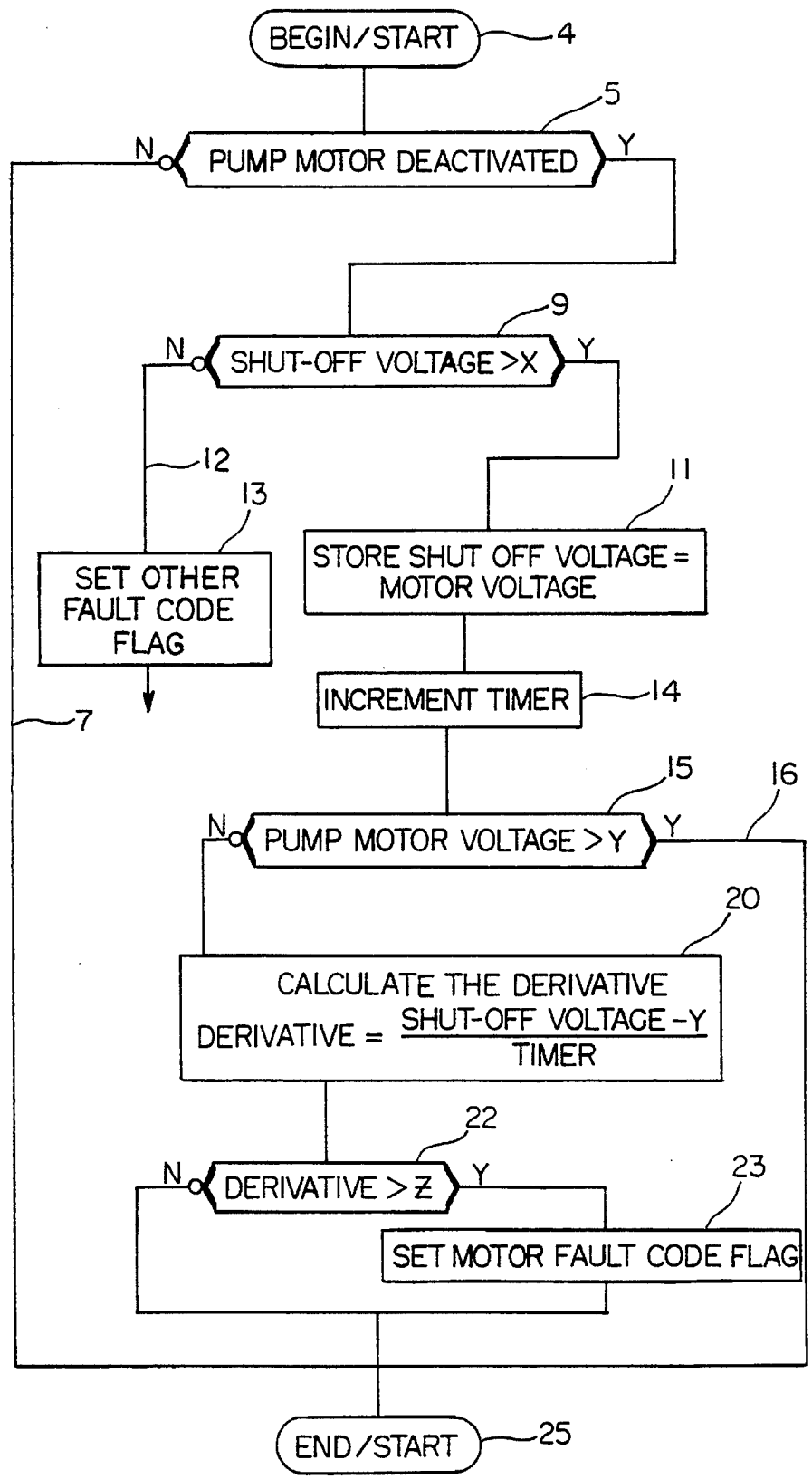
FIG. 2 is a simplified flow chart of the present invention.

Referring to FIG. 2, a simplified software flow diagram illustrates the steps of the process which is implemented via software within the ECU. The software commences the process at BEGIN or START Block 4 and proceeds to Block 5 wherein the ECU determines whether or not the pump motor has been deactivated. The software will look for a turn off command flag approximately every five milliseconds. If the turn off command flag for the pump motor is not present, then the test sequence is continued as indicated via Line 7 which leads to a reinitiation of the program at Block 4 wherein the software of the ECU continues to look for the turn off command flag. Once the turn off command flag has been detected, the ECU via the software program determines at Block 9 whether or not the motor voltage is greater than voltage X which is set at a predetermined value of approximately seven volts. If the program determines that the motor voltage was less than X or approximately seven volts, then line 12 leads to a OTHER FAULT CODE flag at Block 13 which will initiate a disabling of the anti-lock brake system and illuminate the ABS warning light in the vehicle, because the fact that the motor voltage at deactivation is less than voltage X means that the pump motor did not receive sufficient voltage to run the test, or possibly did not operate appropriately for some reason. The pump motor could fail to operate for any number of reasons, such as a wiring problem or a relay problem, which could result in either a lack of motor operation or operation at an unacceptable level. Whatever the reason may be for either the lack of operation or appropriate operation, such will be determined by the program as a result of the lack of the presence of a motor voltage greater than the predetermined voltage X. Should the program at Block 9 determine that the motor voltage is greater than voltage X, then this means that there has been at least a sufficient initial voltage on the motor monitor circuit to indicate a continued operation of the motor testing via the software program. At Block 11, the ECU will, via the software, store the motor voltage present on the motor monitor circuit at the time the motor was shut-off. The shut-off or command off voltage level present on the monitor circuit is set equal to the MOTOR VOLTAGE, this being accomplished only one time within the program. At Block 14, the software program timer which is set at five milliseconds is incremented by another 5 millisecond counter (one). At Block 15, the ECU via the software program examines the actual motor voltage present after the shut-off or deactivation command for the motor pump to determine if it is greater than a predetermined voltage Y which is set at approximately one volt. If the actual motor voltage at this point subsequent to the shut-off of the motor is still greater than voltage Y, then the voltage has not yet decayed sufficiently to determine appropriate operativeness of the pump motor. Thus, the program operatively returns via Line 16 to reinitiate the testing, and this return loop will continue to re-initiate the program until the motor voltage is determined by the program to be less than voltage Y. At the point where the motor voltage is less than voltage Y, the program then proceeds to Block 20 wherein the DERIVATIVE of the shut-off voltage is calculated. The shut-off voltage value ("MOTOR VOLTAGE") has subtracted from it the voltage Y and then the difference is divided by the timer value, which may be a predetermined time such as five milliseconds, to determine the shut-off DERIVATIVE which is compared with the voltage fault value Z. The voltage fault value Z is a predetermined value (such as 134 volts/sec) which is compared with the shut-off derivative to again make a determination of whether or not the pump motor has operated appropriately. If the shut-off voltage DERIVATIVE is greater than the voltage fault value Z, this indicates a problem with the pump motor such that Block 23 will set the MOTOR FAULT CODE that operatively disables the anti-lock braking system and illuminates the warning light. The program will then proceed to Block 25 which is the END/RETURN Block where it will return to Block 4.

Figure 3:
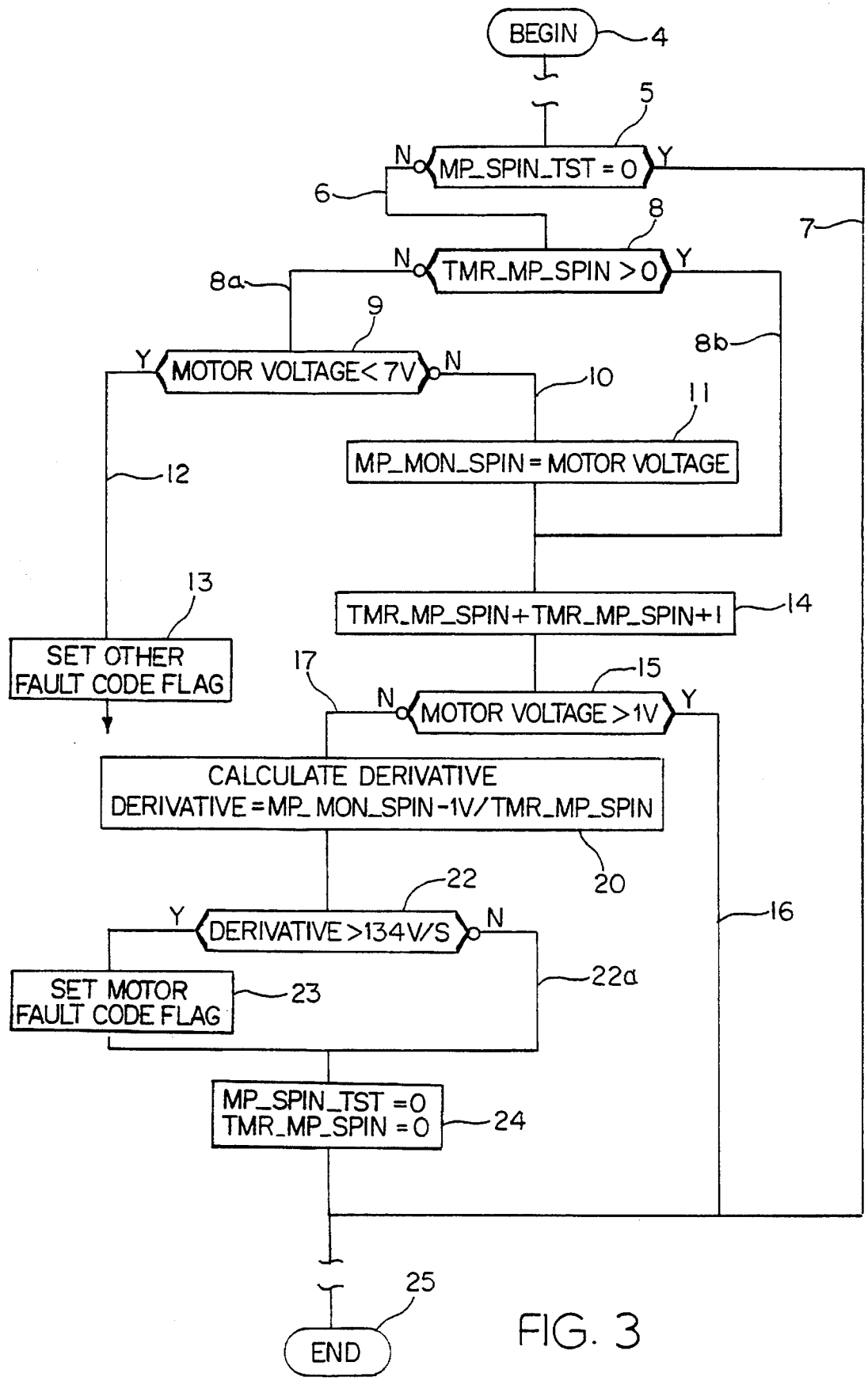
FIG. 3 is more detailed flow diagram of the flow chart illustrated in FIG. 2.

FIG. 3 illustrates in more detail a software flow diagram which implements the method or process illustrated in FIG. 2. The software program begins at Block 4 and then, after proceeding through other software steps, proceeds to Block 5 which determines whether or not the pump motor has been deactivated. At motor deactivation, the ECU sets a value of one and if this is detected at Block 5, then because MP_SPIN_TST does not equal zero the program proceeds via Line 6 to Block 8. However, if the motor has not been turned off, then a zero value is detected and the program proceeds via Line 7 to the END/RETURN Block 25 to re-initiate the program. At Block 8, the counter for the software program is still at zero, so that if TMR_MP_SPIN is zero the program will proceed via Line 8A to Block 9. After proceeding through Block 9 and via Line 10, the program will set the initial motor deactivation voltage value equal to MOTOR VOLTAGE at Block 11. This is accomplished because at the initial shut-off of the motor the counter is set at zero and detected as such at Block 8. However, if it is the second or later loop of the program, then at Block 8 the counter is at one or higher and the program will proceed via Line 8B to Block 14 and the initial shut-off or deactivation voltage value is not saved as the MOTOR VOLTAGE at Block 11. Thus, the shut-off or deactivation voltage value is set equal to the MOTOR VOLTAGE only one time within the program.

At Block 9, the software program determines whether or not the actual motor voltage is less than or equal to/greater than seven volts. If the motor voltage is less than seven volts, then as discussed above there is detected a problem sufficient to have the program proceed via Line 12 to the SET OTHER FAULT CODE at Block 13 which will disable the anti-lock braking system and illuminate the warning light or mechanism. However, if actual motor voltage is at least seven volts or greater, then Block 9 proceeds via Line 10 to Block 11 where the motor deactivation or shut-off voltage, MP_MON_SPIN, is set equal to MOTOR VOLTAGE and saved or retained for later utilization by the program. The program then proceeds to Block 14 wherein the counter is incremented, i.e. it is incremented by another five milliseconds which is equal to the counter number one, before proceeding to Block 15. At Block 15, the software program determines whether or not the actual motor voltage is greater than one volt (value X in FIG. 2). If the actual motor voltage is greater than one volt, then the program proceeds via Line 16 to the END/RETURN Block 25. If motor voltage is less than or equal to one volt, then the program proceeds via Line 17 to Block 20 wherein the program calculates a DERIVATIVE by determining the difference between the saved motor deactivation voltage value (MP_MON_SPIN or "MOTOR VOLTAGE") and the Y value or one volt, divided by the timer value (5 milliseconds/loop). Next, at Block 22, the DERIVATIVE is compared with the predetermined value Z which is 134 volts per second, to determine whether or not the anti-lock braking system should be disabled. If the DERIVATIVE is equal to or less than 134 volts per second, then the program proceeds via Line 22A to Block 24. At Block 24, the counter is cleared to zero (MP_SPIN_TST is set equal to zero) because the test has been completed, and the program will not be run again as a result of the counter being set at zero so that at Block 5 the program will proceed via Line 7 to the RETURN/END Block 25. Also at Block 24, the TMR_MP_SPIN is set equal to zero so that when the pump motor is deactivated the program will retain one time the shut-off voltage as the MOTOR VOLTAGE, as described above. However, if the DERIVATIVE is greater than 134 volts per second, then the program proceeds to the SET FAULT CODE Block 23 which disables the anti-lock braking system and illuminates the warning light or signal, before proceeding to Block 24 and the END/RETURN Block 25.

The present invention provides a substantial improvement over prior methods for determining if the pump motor is either operating or operating at an acceptable level. Failures such as the magnets being separated from the motor housing or a frozen drive line are mechanical failures that would not cause the pump motor to fail the continuity test at drive-off, and the vehicle operator upon the initiation of anti-lock braking would then have a sudden unexpected loss of the anti-lock braking system without any prior warning. The present invention enables the anti-lock braking system via the ECU software to determine whether or not the motor runs at an acceptable level of performance during drive-off. If the motor fails to operate at an acceptable level of performance, the ECU will disable the anti-lock braking system and activate a warning light and/or audible warning mechanism so that the vehicle operator knows that the anti-lock braking system is not functioning.

We claim:

1. An anti-lock braking system which determines the operability of a pump motor, comprising:
   (a) means for determining if the pump motor has been deactivated and the voltage of the pump motor at said deactivation,
   (b) means for determining if the voltage at deactivation exceeds a predetermined first voltage value,
   (c) means for initiating anti-lock braking system failure warning means if the deactivation voltage is less than said predetermined first voltage value,
   (d) means for maintaining the deactivation voltage as a shut-off voltage value if the deactivation voltage is greater than said first predetermined voltage value and proceeding to a next step (e),
   (e) means for incrementing a cycle time of the method,
   (f) means for determining if actual motor voltage is greater than a second predetermined voltage value,
   (g) means for calculating a derivative of the difference between said shut-off voltage value and said second predetermined voltage value if the actual motor voltage is less than said second predetermined voltage value,
   (h) means for determining if the calculated derivative is greater than a set fault value, and
   (i) means for initiating said anti-lock braking system failure warning means if said derivative is greater than said set fault value.

2. The system in accordance with claim 1, further comprising means for recommencing at step (a) if said actual motor voltage is greater than said second predetermined voltage value.

3. The system in accordance with claim 1, wherein said first predetermined voltage value is approximately seven volts.

4. The system in accordance with claim 1, wherein said second predetermined voltage value is approximately one volt.

5. The system in accordance with claim 1, wherein said cycle time comprises approximately five milliseconds.

6. The system in accordance with claim 1, wherein said deactivation voltage is approximately in the range of 10 to 13 volts.

7. The system in accordance with claim 1, wherein the derivative is calculated if the actual motor voltage is equal to said second predetermined voltage value.

8. The system in accordance with claim 1, wherein the deactivation voltage is maintained only once as the shut-off voltage.

9. A method of determining the operability of a pump motor in an anti-lock braking system, comprising the steps of:
   (a) determining if the pump motor has been deactivated and the voltage of the pump motor at said deactivation,
   (b) determining, if the voltage at deactivation exceeds a predetermined first voltage value,
   (c) initiating anti-lock braking system failure warning means if the deactivation voltage is less than said predetermined first voltage value,
   (d) maintaining the deactivation voltage as a shut-off voltage value if the deactivation voltage is greater than said first predetermined voltage value and proceeding to a next step (e),
   (e) incrementing a cycle time of the method,
   (f) determining if actual motor voltage is greater than a second predetermined voltage value,
   (g) calculating a derivative of the difference between said shut-off voltage value and said second predetermined voltage value if the actual motor voltage is less than said second predetermined voltage value,
   (h) determining if the calculated derivative is greater than a set fault value, and
   (i) initiating said anti-lock braking system failure warning means if said derivative is greater than said set fault value.

10. The method in accordance with claim 9, further comprising the step of recommencing at step (a) if said actual motor voltage is greater than said second predetermined voltage value.

11. The method in accordance with claim 9, wherein said first predetermined voltage value is approximately seven volts.

12. The method in accordance with claim 9, wherein said second predetermined voltage value is approximately one volt.

13. The method in accordance with claim 9, wherein said cycle time comprises approximately five milliseconds.

14. The method in accordance with claim 9, wherein said deactivation voltage is approximately in the range of 10 to 13 volts.

15. The method in accordance with claim 9, wherein the derivative is calculated if the actual motor voltage is equal to said second predetermined voltage value.

16. The method in accordance with claim 9, wherein the method is repeated but the deactivation voltage is maintained only once as the shut-off voltage.

\* \* \* \* \*